UNITED STATES PATENT OFFICE.

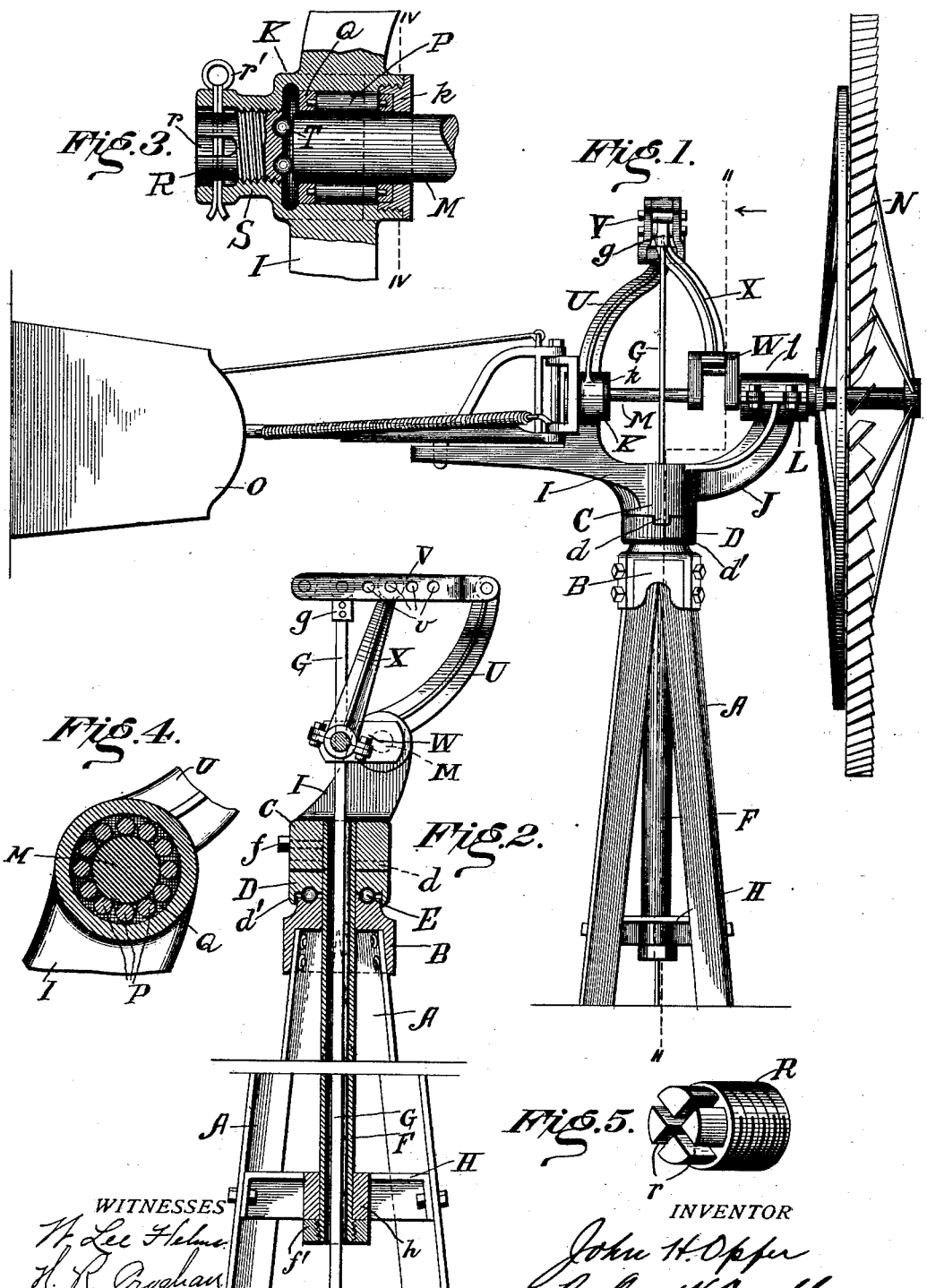

JOHN H. OPFER, OF GENOA, OHIO.

WINDMILL.

SPECIFICATION forming part of Letters Patent No. 717,115, dated December 30, 1902.

Application filed December 28, 1901. Serial No. 87,539. (No model.)

*To all whom it may concern:*

Be it known that I, JOHN H. OPFER, a citizen of the United States, residing at Genoa, in the county of Ottawa and State of Ohio, have invented new and useful Improvements in Windmills, of which the following is a full, clear, and exact description, such as will enable others skilled in the art to which it appertains to make and use the same.

This invention relates to improvements in windmills; and the principal object thereof is to provide a highly-efficient windmill which will be simple in construction, durable and reliable in service, and powerful in operation.

Further objects are to render the machine readily responsive to changes in the direction of the wind, to provide removable antifriction-bearings for the operative parts and to prevent undue wear and strain thereof, to increase the stability of said parts, and to improve generally upon devices of this same general character.

The invention will first be hereinafter more particularly described with reference to the accompanying drawings, which form a part of this specification, and then pointed out in the claims following this description.

In said drawings, in which corresponding parts in the several views are designated by similar letters of reference, Figure 1 is a lateral elevation of a windmill embodying my invention. Fig. 2 represents a vertical section taken on the line II II of Fig. 1 looking in the direction of the arrow. Fig. 3 is a detail view, in vertical longitudinal section, of the rear or vane end bearing for the wind-wheel shaft. Fig. 4 is a section taken on line IV IV of Fig. 3, and Fig. 5 is a detail perspective view of an adjustable bearing device which receives the end thrust of the wheel-shaft.

Referring to the drawings by specific letters of reference, A represents a suitable supporting-tower, and the letter B denotes a surmounting cap-piece or turn-table to which the legs of the tower may be bolted or otherwise secured.

The letter C designates the main mill frame or carriage, which supports the wind-wheel and coöperating mechanism and which is rotatably mounted on the tower, being preferably secured upon a removable bearing device D, journaled upon the cap-piece. The said bearing device may be removably secured to the frame or carriage by interlocking lug-and-socket connections, as shown at $d$, or other suitable means and when worn may be replaced at but slight expense, thus obviating the necessity of replacing the entire carriage. A series of balls E or other antifriction devices is preferably interposed between the bearing device and cap-piece, the same being fitted in circular grooves or ball-races formed therefor in the confronting sides or surfaces of the castings, and the bearing device is preferably provided with a depending circular flange $d'$, which overlaps the cap-piece and protects the bearings from the weather. The carriage is provided with an axial bore or opening, and rigidly secured in said opening by a set-screw $f$ or other suitable means or formed integrally with the carriage is a tubular member or hollow spindle F, in which reciprocates the power-transmitting rod G for operating the pump or other machine. The said spindle passes through registering openings therefor in the bearing device and cap-piece, being preferably journaled within the latter for purposes of rigidity and compactness, while its lower end is journaled in a suitable bearing $h$, formed or provided within a plate or bracket H, secured within the tower and provided with a nut or other fastening device $f'$, whereby the several parts are held firmly down upon their bearings, while the mill is rendered readily responsive to changes in the wind.

The mill frame or carriage C consists of a hub portion or casting formed or provided with oppositely-projecting uprising members or standards I and J, which are also laterally inclined to one side of the rod G, as shown in Fig. 2. Said members are provided with horizontally-disposed bearings or journal-boxes K and L, respectively, in which is journaled the shaft M of the wind-wheel N, which is counterbalanced by the weight of the directing-vane O, suitably mounted upon the opposite member of the carriage. The journal-box L is herein represented provided with a removable cover or top section $l$ and the box K with an inner removable end cap $k$, surrounding the shaft and screwing into an interiorly-threaded portion of said box, and in each of said boxes, as shown in Fig. 3, there is preferably provided a series of rollers P or other suitable antifriction devices for the shaft, which may be secured within removable boxes or retainers Q therefor. The wheel-shaft is thus furnished smooth and noiseless antifriction-bearings, and it will be seen that access may be readily had thereto, and the bearings may be removed without removal of the shaft.

The end thrust of the shaft is preferably received upon an adjustable nut or cylindrical block R, threaded and screwing into an interiorly-threaded sleeve or tubular extension S of the rearward box K or otherwise adjustably retained in said sleeve. An antifriction-ball T or a series of such devices, if desired, is preferably interposed between said bearing device and the end of the shaft, said ball or balls being retained within a circular groove or ball-race therefor in the nut, thus reducing the friction to a minimum. The rearward end or portion of the bearing device R may be formed with a number of intersecting slots $r$, in which a suitable device for turning the nut may be inserted and which receive a retaining-pin $r'$, inserted through the sleeve S to secure said device at the desired adjustment. On withdrawing the pin $r'$ the said bearing device may be turned to take up the wear and the pin reinserted and passed through another slot to secure the device at such position.

Projecting upwardly from the bearing K of the standard I is an inwardly-curved arm U, also laterally inclined in substantially the same direction as said standard. To the upper end of this arm is fulcrumed a rocker arm or lever V, having a swivel connection, as at $g$, with the power-transmitting rod G. The wind-wheel shaft is provided intermediately the two members of the carriage with a crank W or suitable equivalent device, from which the lever V is operated by a connecting-rod or pitman X, a series of openings $v$ being preferably provided in said lever for attachment of said pitman at different points for the purpose of adjustment of the stroke. Power is thus transmitted to the rod G directly and without lost motion, while the parts are arranged to utilize the force of the wind to the best possible advantage.

It will be observed that shaft M is located close beside the power-transmitting rod G, so that crank W revolves between said rod and standard J instead of in alinement with said rod, whereby the pitman X is operated nearly in the same vertical plane with rod G, and consequently without loss of power. As shown in Fig. 1, the arm U and pitman X are upwardly curved or inclined in opposite directions or toward the rocker-arm V, which is straight, thus bringing the fulcrum of the rocker-arm, its connection to the pitman, and its connection to the power-transmitting rod in alinement. The opposite inclinations of the arm and pitman also give strength and stability to the structure.

The operation and advantages of the device will be apparent from the foregoing description, taken in connection with the accompanying drawings. It will be understood, of course, that the device is susceptible of various modifications in details of construction and arrangement without departing from the scope of the invention.

Having thus fully described my invention, what I claim as new, and desire to secure by Letters Patent of the United States, is—

1. In a windmill, the combination with a supporting-tower having a cap or turn-table secured thereon, of a rotatable mill frame or carriage consisting of a hub journaled on said cap formed with opposite uprising members or standards both laterally inclined to one side of the axis of said carriage, a horizontal wind-wheel shaft journaled in bearings on said members and having an intermediate crank, an inwardly-curved arm rising from one of said members, a rocking lever fulcrumed to said arm, a pitman connecting said lever and crank, and a vertically-reciprocating power-transmitting rod working in an axial opening in the carriage and connected to said rocking lever, substantially as described.

2. In a windmill, the combination of a rotatable frame or carriage consisting of a hub portion having opposite uprising standards both laterally inclined, a vertically-reciprocating power-transmitting rod working in an axial opening in said carriage, a horizontal windmill-shaft journaled in bearings in said standards and having an intermediate crank located between the power-transmitting rod and one of said standards, an inwardly-curved arm arising from the opposite standard, a rocking lever fulcrumed to said arm and connected to said power-transmitting rod, and an oppositely-curved pitman connecting said crank and rocking lever, substantially as described.

3. In a windmill, the combination with a supporting-tower having a cap or turn-table secured thereon, of a rotatable mill frame or carriage mounted on said cap and having a lower removable bearing-plate rigidly secured thereto by interengaging lug-and-socket connections, a tube fitting within axial bores in the cap, bearing-plate and carriage and holding the latter in place, a wind-wheel supported by said carriage, a vertically-reciprocatory power-transmitting rod working in said tube, and connections between the wheel-shaft and rod for operating the same, substantially as described.

4. In a windmill, a frame or carriage consisting of a hub portion having opposite uprising members or standards, a horizontal wind-wheel shaft journaled in bearings in said standards and having an intermediate crank, antifriction devices for said shaft mounted in boxes or retainers removably fitted in said bearings, the front bearing or that next to the wind-wheel having a removable top or cover and the rear bearing having a removable end cap, an arm arising from said rear bearing, a rocking lever pivoted thereto and connected with an axial power-transmitting rod, and a pitman connecting said lever and crank, substantially as described.

5. In a windmill, a frame or carriage, a longitudinal wind-wheel shaft journaled in suitable bearings supported thereby, and an adjustable thrust-bearing for said shaft consisting of a threaded cylindrical block screwed into the rear bearing, said block having intersecting slots formed in its rear end to receive a turning device, and a pin or cotter adapted to be inserted through the rear end of said bearing and to engage one of said slots to secure the block at the desired adjustment, substantially as described.

In testimony whereof I affix my signature in presence of two witnesses.

JOHN H. OPFER.

Witnesses:
C. E. BAKER,
JOHN CHENEY.